April 16, 1935. K. F. W. MEYERTONS 1,998,142
INDUCTION MOTOR AND MEANS FOR REGULATING SPEED OF INDUCTION MOTORS
Filed Sept. 21, 1933 2 Sheets-Sheet 1
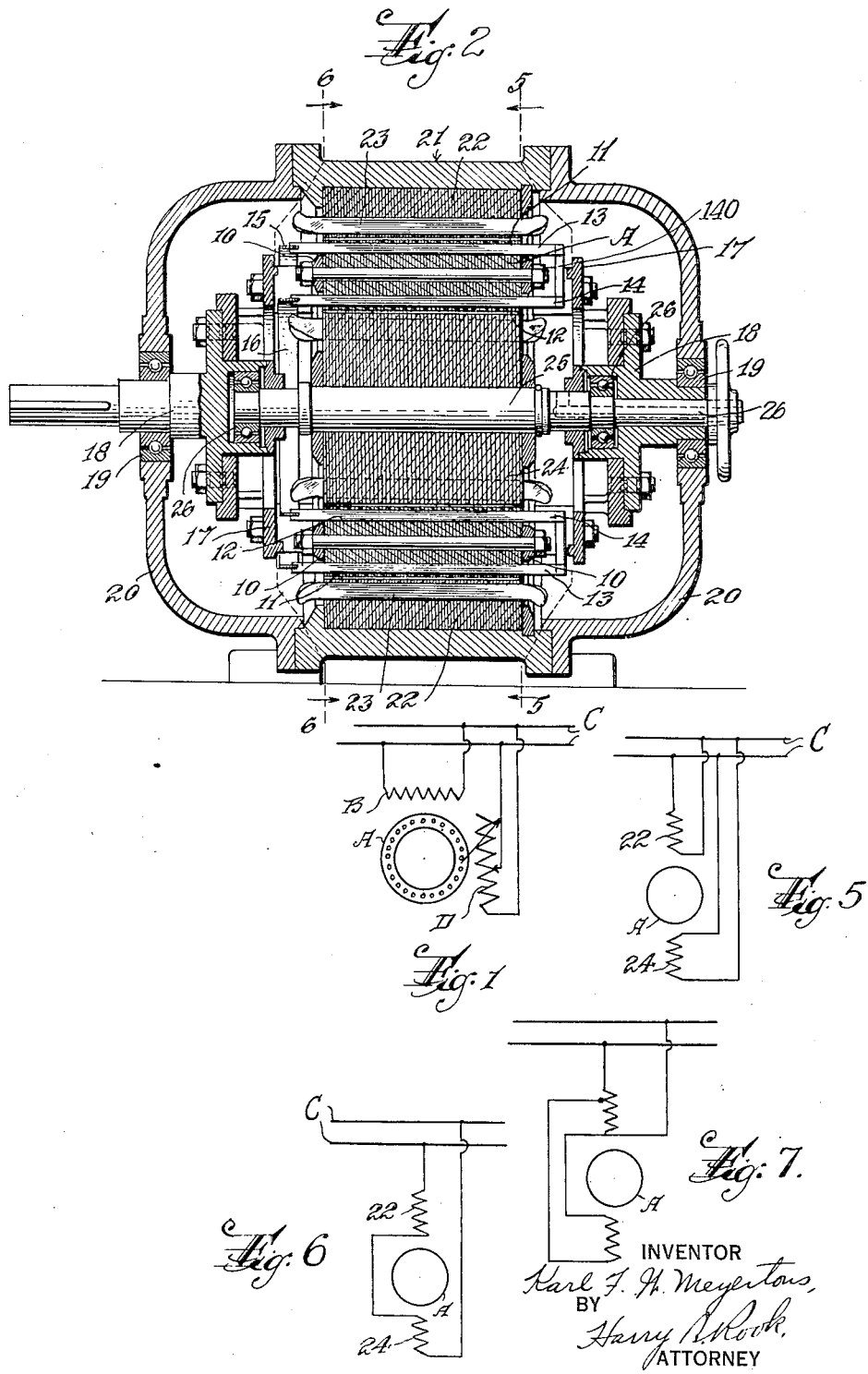

April 16, 1935.  K. F. W. MEYERTONS  1,998,142
INDUCTION MOTOR AND MEANS FOR REGULATING SPEED OF INDUCTION MOTORS
Filed Sept. 21, 1933   2 Sheets-Sheet 2

INVENTOR
Karl F. W. Meyertons,
BY Harry S. Mook,
ATTORNEY

Patented Apr. 16, 1935

1,998,142

UNITED STATES PATENT OFFICE 1,998,142

INDUCTION MOTOR AND MEANS FOR REGULATING SPEED OF INDUCTION MOTORS

Karl F. W. Meyertons, Ridgefield Park, N. J., assignor, by mesne assignments, to Gustave F. Straub, Philadelphia, Pa.

Application September 21, 1933, Serial No. 690,327

5 Claims. (Cl. 172—274)

This invention relates in general to induction motors and particularly the invention is directed toward the regulation of speed of such motors. Generally, the speed of an induction motor is determined by the frequency of the current and the number of poles in the motor, but speed regulation can be obtained by the use of special auxiliary equipment.

Among the methods now known for regulating the speed of induction motors, are four important methods which, to facilitate an understanding of my invention, may be profitably briefly described. One method consists in increasing the resistance in the rotor circuit of a wire wound rotor by a controller which increases or decreases the resistance in the rotor by increments, the rotor leads being connected to slip rings and the resistances being connected to brushes contacting with the slip rings. Another method consists in supplying additional currents to the rotor circuit over slip rings by a frequency changer which has a commutator, while a third method consists in regulating the speed of induction motors stepwise or step-by-step through the use of a cascade connection. Still another method involves the arrangement of the stator windings so that they may be changed quickly as by switches, to change the number of poles. The use of resistances according to the first-mentioned method results in current losses, while the other three methods involve complex and expensive apparatus.

One object of my invention is to provide a novel and improved induction motor and means for regulating induction motors whereby the speed of the motor can be regulated without material current losses and without the necessity for complicated and expensive apparatus.

Other objects are to provide such a motor wherein the speed shall be regulated by transforming into the rotor or secondary circuit, a counter-current which shall partially oppose or counteract the current transformed between the rotor and the stator, by the use of an annular rotor core having two mechanically connected and substantially magnetically independent concentric sections, and two stators arranged coaxially with said rotor with one stator outside the rotor and the other stator within the rotor, the rotor core having a winding with two electrically connected sections one on the exterior and the other on the interior thereof and wherein the voltage in one stator is varied, or one stator is rotated, so as to induce a current in the rotor circuit in opposition to the current induced by the other stator; to provide an induction motor having a novel and improved construction and arrangement of stators and rotors to accomplish such regulation of the speed of the motor; and to obtain other advantages and results as will be brought out by the following description.

For the purpose of illustrating the principles of my invention I have shown in the accompanying drawings the invention embodied in a squirrel-cage induction motor, although the invention is susceptible of use in induction motors having wire wound rotors, and while I have shown the motors embodying certain details of construction this is primarily for the purpose of illustrating the principles of the invention and the details of construction of the motor may be modified and changed by those skilled in the art without departing from the spirit or scope of the invention.

Referring to said drawings, in which corresponding and like parts are designated throughout by the same reference characters, Figure 1 is a diagrammatic illustration of an induction motor circuit embodying my invention.

Figure 2 is an enlarged vertical longitudinal sectional view through another form of motor;

Figure 8:
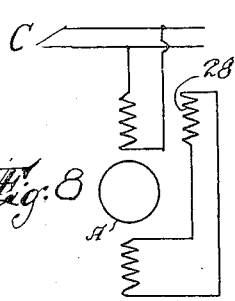
Figure 9:
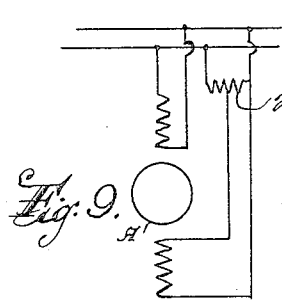
Figure 10:
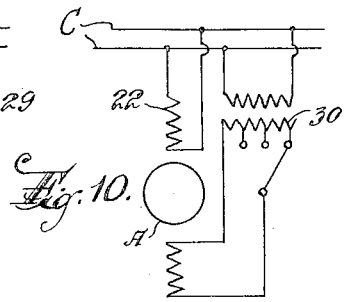
Figure 11:
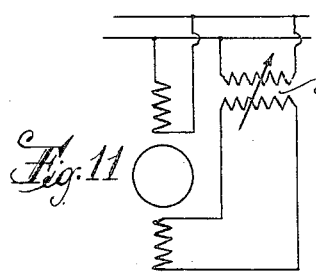
Figure 12:
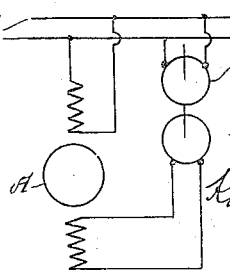

Figures 5, 6, 7, 8, and 9 are diagrammatic views showing modifications of the motor and Figures 10, 11 and 12 are diagrammatic views showing further modifications of the invention.

As above stated, the invention generally consists in the regulation of the speed of induction motors by transforming into the rotor or secondary circuit an additional or counter-current in opposition to the current transformed between the rotor and stator. A circuit for an induction motor embodying the invention is diagrammatically shown in Figure 1 where the reference character A designates the rotor which may be of the squirrel cage type, B designates the stator and D designates a separate winding which may constitute a second stator or be a variable transformer, connected to the same net C as the stator B, for transforming into the rotor A an additional or counter current to oppose the current transformed into the rotor by the stator B. This stator may be rotatable relatively to the other stator B. As shown, the motor is a single phase motor, but the invention may also be embodied in polyphase motors.

In this motor the speed of rotation of the rotor can be varied by rotating the rotatable stator. When this is done, the rotatable stator will induce a current in the combined circuits of the two rotor cores which will oppose the current transformed between the stationary stator and the rotor; or in other words, by rotation of the rotatable stator, the phases in said stator are shifted relative to the phases of the other stator so as to cause a reduction of the current which is induced in the combined rotor windings, whereby the speed of rotation of the rotors will be reduced and the rotor under certain known conditions will run with greater slip than if no countercurrents were present.

In operation, one part of the energy is taken up by the stationary stator and transformed in the rotor into mechanical energy for rotating the rotor, the other part of the electrical energy is transformed over the rotatable stator into the net. It has been found that in a motor constructed in accordance with the invention and operated according to the method of the invention, the speed of rotation of the motor can be regulated without material losses which is in strong contrast to motors in which the speed is controlled by the use of resistances. As will be observed, the regulation of the motor of the invention can be accomplished simply and without complicated auxiliary mechanism or special arrangements of the stator windings and switch mechanism for changing the number of poles.

Figure 3:
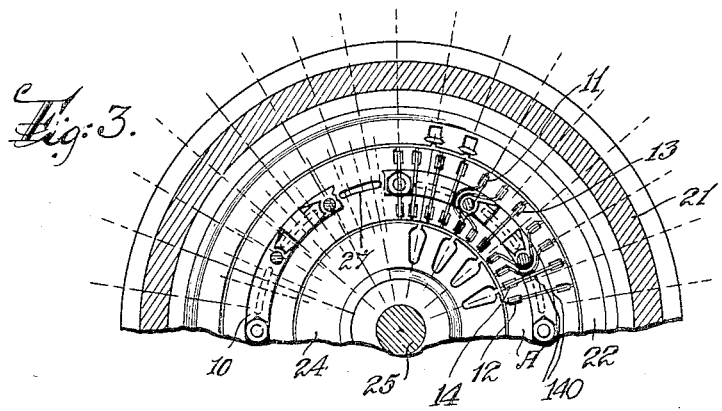
Figure 3 is a fragmentary transverse vertical sectional view on the line 5—5 of Figure 4, the stator windings being omitted.
Figure 4:
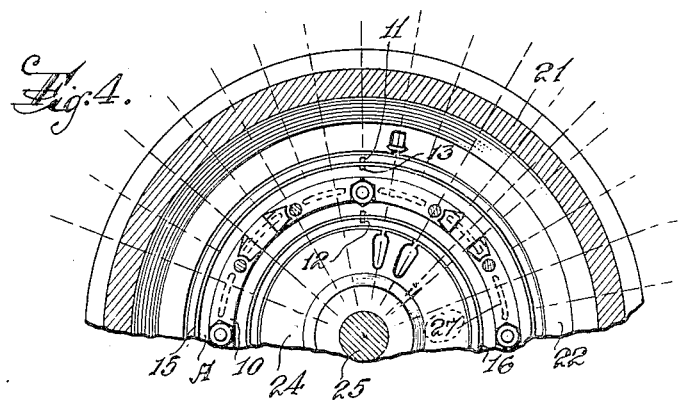
Figure 4 is a similar view on the line 6—6 of Figure 2.

Figures 4, 5 and 6 illustrate the now preferred form of motor embodying the invention. In this form of the invention, the rotor A is annular, comprising laminations of iron as usual which are clamped between brass end rings 10. The rotor has notches 11 and 12 on its outer and inner peripheries respectively, in which are arranged the respective conducting bars 13 and 14. The conducting bars on the outer periphery are electrically connected at one end to the conducting bars 13 on the inner periphery by suitable connectors 140. At their other ends the conducting bars 13 and 14 are short-circuited by the respective rings 15 and 16. The rotor core A is mounted at its ends on supporting rings 17 which are connected to hubs 18 that are journaled in bearings 19 in end caps 20 of the motor frame 21, whereby the rotor may revolve in the bearings 19.

The motor has two stators or stator sections within one of which is arranged outside the rotor A and the other of which is arranged within the rotor. The outer section 22 comprises the usual laminated core and the usual windings 23, while the inner section 24 is formed of laminations which are clamped on an auxiliary shaft 25 which is journaled in bearings 26 within the hubs 18 coaxially with the rotor. One of the hubs 18 is tubular and one end of the shaft 25 projects beyond the hub as indicated at 26 so that the shaft may be rotated by hand or by application of suitable rotating mechanism. The windings of the two stator sections 22 and 24 may be connected to the same net.

The rotor laminations are preferably provided with longitudinal slots 27 intermediate the inner and outer periphery of the rotor core so that the major parts of the areas of adjacent portions of the outer and inner sections of the rotor core are in spaced relation to each other so as to prevent or reduce counter-action between the magnetic circuits of the two sets of bars 13 and 14.

The operation of this motor is generally the same as that hereinbefore described. When the two stator sections are connected to the same net, and the inner stator section 24 is rotated, the speed of the rotor will be reduced. Upon rotation of the inner stator section 24, a current is induced in the rotor bars 14 which opposes the current transformed between the outer section 22 and the outer rotor bars 13; or in other words, upon rotation of the inner stator section, the phases in the inner stator section are shifted relative to the phases of the outer stator section so as to reduce the current induced in the circuit including both of the outer and inner rotor bars 13 and 14. It will be observed that the energy which is transformed between the inner stator and the rotor remains in the stator for a short period of time, and the amount of energy is much smaller than that occurring in the outer stator section. Part of the electrical energy is taken up by the outer stator section and transformed in the rotor into mechanical energy, while the other part of the energy is transformed over the inner stator section back to the net.

The inner or rotatable stator can be connected to the same net in series or in parallel with the stationary or outer stator, and Figure 7 shows the inner stator 24 connected in parallel with the outer stator 22, while Figure 8 shows the stators connected in series.

In order to produce the proper volt and ampere combination in the rotatable or inner stator the stators can be connected in circuit as shown in Figure 9.

It is also possible to supply current to the inner or rotatable stator from a second winding 28 on the outer stator, separate from and in inductive relation to the windings 23, or if desired, the inner or rotatable stator may be supplied with current from the net through a separate transformer 29 as shown in Figure 11.

Figure 12 shows the inner or rotatable stator supplied with current through a step transformer 30 which is connected to the net in parallel to the outer stator 22.

The invention also contemplates the regulation of the speed of rotation of the rotor of an induction motor of the general character described without the necessity of rotatably mounting either of the stators or stator sections; that is, the speed may be regulated by varying the voltage or the phase angle of the current in one of the stator windings. For example, Figure 13 shows a circuit wherein the phase angle of the current in one stator, for example the inner stator, may be shifted relative to the outer or other stator by the use of a transformer 31 of the voltage regulator type. The same result may be accomplished by the use of a separate motor generator set 32 whose pole wheels or stator windings are set against each other or can be set so, as shown in Figure 14.

In all forms of the invention, the rotor core is double or comprises two sections which are mechanically connected together and are substantially magnetically independent due to the slots 27 or the use of separate laminations for the two sections.

With all forms of the invention an extremely simple and inexpensive induction motor can be produced with means for regulating the speed of rotation of the rotor without material losses; the invention entirely overcomes the necessity for complicated auxiliary apparatus now commonly used for regulating the speed of induction motors.

Having thus described my invention, what I claim is:

1. An induction motor comprising an annular rotor core having two mechanically connected and substantially magnetically independent concentric sections, two stators arranged coaxially with said rotor with one stator outside said rotor and the other stator within said rotor, said rotor core having a winding with two electrically connected sections one on the exterior of the core and the other on the interior, the inner stator being rotatable.

2. A variable speed induction motor comprising two stator cores having separate windings, a rotor having two mechanically connected and substantially magnetically independent cores each having a winding in circuit with the winding of the other, and an additional and separate winding on one of said stator cores connected in circuit with the winding on other stator core, the last mentioned stator core and its winding being rotatable.

3. A variable speed induction motor comprising an annular rotor core having two mechanically connected and substantially magnetically independent concentric sections and two stator cores each having a winding separate from the other, one stator being exterior of the rotor core and the other stator being within the rotor core, and conducting bars in each section of the rotor core electrically connected at one end to the conducting bars of the other section, and short-circuiting rings connecting the bars of the respective sections, one of said stator cores and its winding being rotatable.

4. A variable speed induction motor comprising an annular rotor core having two mechanically connected and substantially magnetically independent concentric sections, two stator cores each having a winding separate from the other, one stator being exterior of the rotor core and the other stator being within the rotor core, and conducting bars in each section of the rotor core electrically connected at one end to the conducting bars of the other section, and short-circuiting rings connecting the bars of the respective sections, and another winding on the first-mentioned stator core in inductive relation to the winding thereon and electrically connected in circuit with the winding of the other stator, one of said stator cores and its winding being rotatable.

5. A variable speed induction motor comprising an annular rotor core having two concentric sections the major parts of the areas of the adjacent portions of which are in spaced relation to each other to make said sections substantially magnetically independent of each other, two stators arranged coaxially with said rotor with one stator outside said rotor and the other stator within said rotor, said rotor core having a winding with two electrically connected sections one on the exterior of the core and the other on the interior, one of said stators being rotatable.

KARL F. W. MEYERTONS.